G. CROSBY.
ELECTRICAL SYSTEM OF DISTRIBUTION.
APPLICATION FILED SEPT. 1, 1915.
1,268,438.
Patented June 4, 1918.
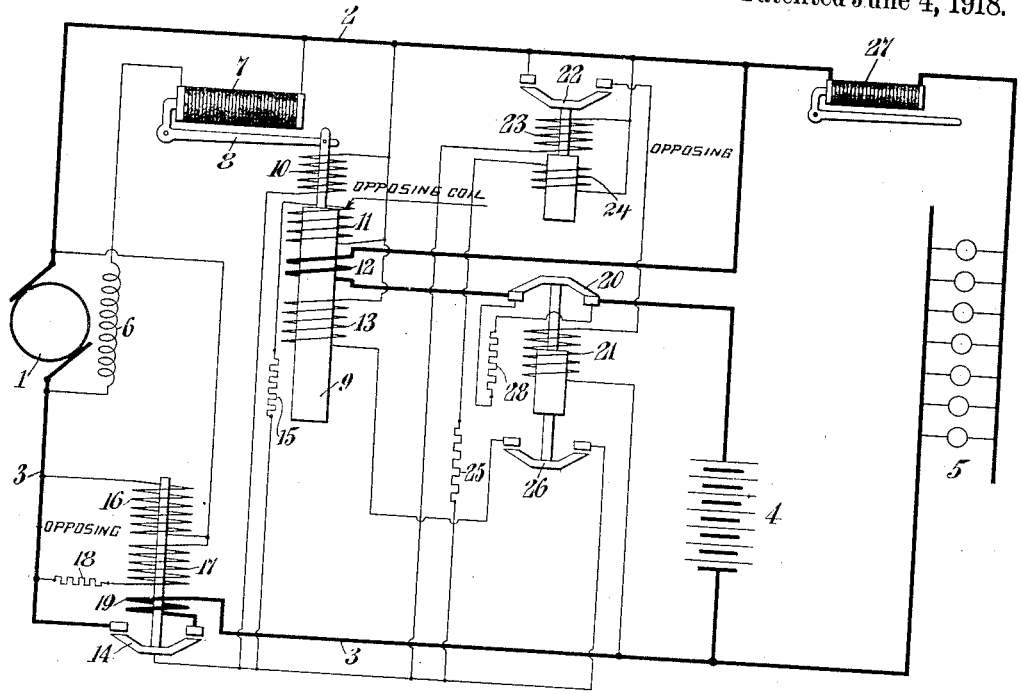
INVENTOR
Gorham Crosby
BY
Kenyon & Kenyon
ATTORNEYS

UNITED STATES PATENT OFFICE.

GORHAM CROSBY, OF GLEN RIDGE, NEW JERSEY, ASSIGNOR TO GOULD COUPLER COMPANY, A CORPORATION OF NEW YORK.

ELECTRICAL SYSTEM OF DISTRIBUTION.

1,268,438.  Specification of Letters Patent.  Patented June 4, 1918.

Application filed September 1, 1915. Serial No. 48,427.

*To all whom it may concern:*

Be it known that I, GORHAM CROSBY, a citizen of the United States, and a resident of Glen Ridge, county of Essex, State of New Jersey, have invented certain new and useful Improvements in Electrical Systems of Distribution, of which the following is a specification.

My invention relates to electrical systems of distribution in which a storage battery is charged from a generator and at certain times adapted to supply a work or translation circuit. My invention is particularly applicable to systems for the electric lighting of railway cars, wherein the generator is driven at variable speed, as from the car axle, and charges the battery and supplies the lights when running at sufficient speed, and in which the battery supplies the lights when the car is at rest and the generator not running.

In such systems it has been proposed to regulate the generator by means of a current coil and a voltage coil controlling a variable resistance to limit the generator current and voltage. In such systems however, upon the battery becoming substantially charged the decrease in current in the current coil makes it necessary that the generator voltage increase more than desired before the charging of the battery can be substantially stopped. In order to overcome this disadvantage in such systems I provide means for practically opening the circuit between the generator and battery to stop the charging when the desired voltage has been reached.

This is accomplished without disconnecting the generator from the work circuit so that the latter may continue to be supplied by the generator. In order that reduction of current in the current coil due to the stopping of the charging, may be compensated for, I preferably provide an additional coil acting to compensate for this.

Further objects, features and advantages will more clearly appear from the detailed description given below taken in connection with the accompanying sheet of drawings which forms a part of this specification.

The drawing accompanying this specification is a diagram of a system which includes one specific embodiment of my invention.

Referring to the drawing, 1 represents the generator, 2 and 3 the main conductors therefrom, 4 the storage battery and 5 the work circuit connected across the conductors 2 and 3. 6 represents the shunt field windings of the generator and 7 a carbon pile variable resistance in series therewith. A lever 8 operates the pile 7, the lever being actuated by the core 9 of a solenoid comprising coils 10, 11, 12 and 13. The coils 10 and 11 are connected across the generator mains when the main switch 14 is closed. The coil 11 has in series therewith a resistance 15 which is selected or situated so that it is not materially affected by temperature variations of the solenoid. The coil 11 is the predominating voltage coil while the coil 10 opposes it, the purpose being to compensate for the effect of temperature variations on the coil 10. Coil 12 is a current coil serially connected between the generator and battery in the battery branch so that it acts on the pile 7 by means of the core and lever to limit the battery charging current, while the coil 10 acts to limit the generator voltage.

The main switch is closed when the voltage of the generator has attained the desired value by the resultant pull of the voltage coils 16 and 17, the coil 17 having in series therewith a resistance 18 so that compensation for temperature variations is effected. The switch 14 is also provided with the usual reverse current coil 19.

Connected in circuit between the generator and battery is a switch 20 shown in the battery branch so that the opening of this switch acts to stop the charging of the battery while permitting the generator to continue feeding the work circuit. The switch is opened upon the energization of a solenoid 21 connected in a circuit across the battery, which circuit is normally maintained open by a switch 22 controlled by opposing coils 23 and 24 likewise connected across the battery when the main switch is closed. In series with coil 24 is a resistance 25 so that compensation for temperature variations may be effected. On the lower end of switch 20 is provided another switch 26 adapted to close the circuit of coil 13 across the generator mains, that is provided the main switch 14 is closed. One terminal of each of the coils 10, 11, 13, 23 and 24 is connected to the switch 14 so that upon the opening of the switch each of these coils is deënergized and therefore do not consume current when the generator is running below the critical speed.

In operation when the generator attains sufficient speed the main switch 14 closes and the generator supplies the lights 5 and charges the battery 4. The generator voltage and battery current are kept within proper limits by the coaction of the coils 10, 11 and 12 on the generator regulator. When the battery becomes substantially charged as indicated by a predetermined rise in voltage across the generator and battery the switch 22 is automatically closed thus energizing coil 21 whereby switch 20 is opened and switch 26 closed. The opening of switch 20 opens the charging circuit to the battery to stop the battery charging while permitting the generator to continue to supply whatever lamps or work circuit devices are turned on. The opening of switch 20 also practically deënergizes coil 12 and if this reduction in current in coil 12 were not compensated for the generator regulator would permit the generator voltage to increase to a considerably higher value. But on the opening of switch 20, the switch 26 closes the circuit of coil 13 which has substantially enough turns to compensate for the decrease in current in the current coil 12 so that no material rise in voltage of the generator takes place but the voltage is maintained substantially constant until the generator again slows down below critical speed, in which case the main switch 14 will open and the switch 20 automatically close so that the battery will supply the lights.

A lamp or work circuit regulator 27 composed of a lever operated carbon pile is shown connected in series between the battery and work circuit. This is operated automatically in any suitable manner to maintain the voltage applied to the work circuit substantially constant. If desired a resistance 28 may be placed in shunt to the contacts of the switch 20. This resistance is so high however that no material charging current will pass to the battery therethrough.

Although I have described my improvements in great detail and with respect to one particular embodiment thereof I do not desire to be limited to such details and embodiment as many changes and modifications may well be made without departing from the spirit and scope of my invention as defined in the appended claims.

What I claim as new and desire to secure by Letters Patent, is:

1. An electrical system of distribution having in combination a generator, a storage battery and work circuit fed thereby, a coil responsive to changes in the generator voltage, a coil serially connected between the generator and battery, means whereby said coils coact to regulate the generator and means acting to automatically practically open the circuit between the generator and the battery when the battery has become substantially charged without affecting the connection between the generator and work circuit, said last mentioned means also acting to connect the battery in circuit with the work circuit when the generator is not running and a third coil coacting in the regulation of the generator when the circuit to the battery is opened to compensate for the effect of opening the battery circuit upon said serially connected coil.

2. An electrical system of distribution having in combination a generator, a storage battery and work circuit fed thereby, a carbon pile regulating the field strength of the generator, a member of magnetic material controlling the resistance of said pile, a voltage coil and a current coil coacting with said member of magnetic material to regulate the generator and means acting to automatically practically open the circuit between the generator and the battery when the battery has become substantially charged without affecting the connection between the generator and work circuit and a third coil coacting in the regulation of the generator when the circuit to the battery is opened to compensate for the effect of opening the battery circuit upon said serially connected coil.

3. An electrical system of distribution having in combination a generator, a storage battery and work circuit fed thereby, a voltage coil and a current coil coacting to regulate the generator to limit its voltage and current, a switch in circuit between the generator and battery, and means opening said switch when the battery has become substantially charged without affecting the connection between the generator and work circuit and a third coil coacting in the regulation of the generator when the circuit to the battery is opened, to compensate for the decrease in current in said current coil upon the opening of said switch.

4. An electrical system of distribution having in combination a generator, a storage battery and work circuit fed thereby, a carbon pile regulating the field strength of the generator, a member of magnetic material controlling the resistance of said pile, a voltage coil and a current coil coacting with said member of magnetic material to regulate the generator and means acting to automatically practically open the circuit between the generator and the battery when the battery has become substantially charged without affecting the connection between the generator and work circuit and a third coil coacting with said member to compensate for the effect of opening the battery circuit on said current coil.

5. An electrical system of distribution having in combination a generator, a storage battery and work circuit fed thereby, a coil serially connected between the generator and battery and acting to regulate the generator and means active to automatically practically open the circuit between the generator and the battery when the battery has become substantially charged without affecting the connection between the generator and work circuit and another coil acting in the regulation of the generator when the circuit to the battery is opened to compensate for the effect of opening the battery circuit upon said serially connected coil.

6. An electrical system of distribution having in combination a generator, a storage battery and work circuit fed thereby, a coil serially connected between the generator and battery and acting to regulate the generator means whereby the generator voltage is automatically limited and means acting to automatically practically open the circuit between the generator and the battery when the battery has become substantially charged without affecting the connection between the generator and work circuit and another coil coacting in the regulation of the generator when the circuit to the battery is opened to compensate for the effect of opening the battery circuit upon said serially connected coil.

7. An electrical system of distribution having in combination a generator, a storage battery and work circuit fed thereby, means regulating the generator for variations in speed thereof comprising a coil responsive to voltage variations of the generator and a coil serially connected between the generator and battery, and an automatic switch acting to connect the generator to the storage battery and work circuit when the generator has attained sufficient speed therefor and to disconnect the generator when its speed is insufficient therefor, one terminal of said voltage coil being connected to said switch whereby said voltage coil is deënergized upon the opening of said switch.

8. The combination in a system having a variable speed generator, a storage battery and a work circuit, of regulating means for said generator including current and voltage coils cumulatively acting on said means, and means acting when the battery reaches a given state of charge for acting upon the battery circuit and acting upon the regulator to assist the action of the voltage coil thereof.

9. The combination in a system having a variable speed generator, a storage battery and a work circuit, of regulating means for said generator including current and voltage coils cumulatively acting on said means, and means acting when the battery reaches a given state of charge for substantially disconnecting the battery from the system and causing a third coil to act upon said regulating means.

10. The combination in an electrical system of distribution having a variable speed generator, a storage battery and a work circuit, of regulating means for said generator including a normally effective voltage coil and a current coil traversed by battery current and a normally ineffective coil of means electroresponsive to the state of charge of the battery for acting upon the battery branch of the system to reduce the battery current and for rendering the last named coil effective to act cumulatively with said normally effective coil.

In testimony whereof, I have signed my name to this specification.

GORHAM CROSBY.